United States Patent
Esser et al.

(10) Patent No.: US 9,524,462 B2
(45) Date of Patent: *Dec. 20, 2016

(54) CANONICAL SPIKING NEURON NETWORK FOR SPATIOTEMPORAL ASSOCIATIVE MEMORY

(75) Inventors: Steven K. Esser, San Jose, CA (US); Dharmendra S. Modha, San Jose, CA (US); Anthony Ndirango, Berkeley, CA (US)

(73) Assignee: International Business Machines Corporation, Armonk, NY (US)

( * ) Notice: Subject to any disclaimer, the term of this patent is extended or adjusted under 35 U.S.C. 154(b) by 881 days.

This patent is subject to a terminal disclaimer.

(21) Appl. No.: 13/598,915

(22) Filed: Aug. 30, 2012

(65) Prior Publication Data

US 2012/0330872 A1    Dec. 27, 2012

Related U.S. Application Data

(63) Continuation of application No. 12/828,091, filed on Jun. 30, 2010.

(51) Int. Cl.
*G06F 15/18* (2006.01)
*G06N 3/08* (2006.01)
(Continued)

(52) U.S. Cl.
CPC .............. *G06N 3/049* (2013.01); *G06N 3/063* (2013.01); *G06N 3/08* (2013.01)

(58) Field of Classification Search
None
See application file for complete search history.

(56) References Cited

U.S. PATENT DOCUMENTS 5,058,180 A * 10/1991 Khan ................ G06N 3/04
                                              382/158
6,242,988 B1    6/2001 Sarpeshkar
(Continued)

FOREIGN PATENT DOCUMENTS

EP    0399431 A2    7/1991
JP    H06511096 A   12/1994
(Continued)

OTHER PUBLICATIONS

Johnson, Jeffrey et al "A Layered neural architecture for the consolidation, maintenance, and updating of representaitons in visual working memory" Brain Reasearch 1299 2009 [Online] Downloaded Aug. 6, 2015 http://ac.els-cdn.com/S0006899309013882/1-s2.0-S0006899309013882-main.pdf?_tid=c84581e8-3c41-11e5-8585-00000aab0f27&acdnat=1438869073_337ea86b3cf1.*
(Continued)

*Primary Examiner* — Ben Rifkin
(74) *Attorney, Agent, or Firm* — Sherman IP LLP; Kenneth L. Sherman; Hemavathy Perumal

(57) ABSTRACT

Embodiments of the invention relate to canonical spiking neurons for spatiotemporal associative memory. An aspect of the invention provides a spatiotemporal associative memory including a plurality of electronic neurons having a layered neural net relationship with directional synaptic connectivity. The plurality of electronic neurons configured to detect the presence of a spatiotemporal pattern in a real-time data stream, and extract the spatiotemporal pattern. The plurality of electronic neurons are further configured to, based on learning rules, store the spatiotemporal pattern in the plurality of electronic neurons, and upon being presented with a version of the spatiotemporal pattern, retrieve the stored spatiotemporal pattern.

20 Claims, 10 Drawing Sheets

(51) Int. Cl.
   *G06N 3/04* (2006.01)
   *G06N 3/063* (2006.01)

(56) References Cited

U.S. PATENT DOCUMENTS

| | | | |
|---|---|---|---|
| 6,292,023 | B1 | 9/2001 | Herrera |
| 6,463,438 | B1 | 10/2002 | Veltri et al. |
| 7,028,017 | B2 | 4/2006 | Nugent |
| 7,107,252 | B2 | 9/2006 | Nugent |
| 7,392,230 | B2 | 6/2008 | Nugent |
| 7,002,215 | B1 | 8/2008 | Hietala et al. |
| 7,412,428 | B2 | 8/2008 | Nugent |
| 7,426,501 | B2 | 9/2008 | Nugent |
| 7,930,260 | B2 | 4/2011 | Deo et al. |
| 8,103,602 | B2 | 1/2012 | Izhikevich |

FOREIGN PATENT DOCUMENTS

| | | | |
|---|---|---|---|
| JP | 2001344589 | A | 12/2001 |
| JP | 2002304617 | A | 10/2002 |
| WO | 9857245 | A1 | 12/1998 |
| WO | 2004017812 | A2 | 3/2004 |

OTHER PUBLICATIONS

Ermentroit, Bard "Neural Networks as spatio-temporal pattern forming systems" Feb. 1998 [Online] Downloaded Aug. 6, 2015 http://iopscience.iop.org/0034-4885/61/4/002/pdf/0034-4885_61_4_002.pdf.*

Ghosh-Dastidar and Hojjat Adeli, "A New Supervised learning algorithm for multiple spiking neural networks with application in epilepsy and seizure detection" Neural NEtworks 22 2009 [Online] Downloaded Feb. 5, 2016 http://ac.els-cdn.com/S0893608009000653/1-s2.0-S0893608009000653-main.pdf?_tid=4361ee54-cc50-11e5-b6da-00000aacb35f&acdnat=1454708260_f2af.*

Chinese Office Action dated Sep. 3, 2014 for Chinese Application No. 201180025614.X from The State Intellectual Property Office of P.R. China, pp. 1-7, Beijing, China.

Amemori, K. et al., "Unsupervised learning of temporal sequence coded by small interval differences",Technical Report of IEICE, Jul. 27, 1998, The Institute of Electronics, Information and Communication Engineers (IEICE), pp. 93-100, vol. 98, No. 219, Tokyo, Japan (English-language abstract included, p. 1).

Kato, H. et al., "Analysis on network structures of neural networks with STDP learning", Technical Report of IEICE, Apr. 18, 2007, The Institute of Electronics, Information and Communication Engineers (IEICE), pp. 13-22, vol. 107, No. 21, Tokyo, Japan (English-language abstract included, p. 1).

Maeda, M., "Sphincs: Hierarchical Artificial Neural Network Simulator", Technical Report of IEICE, Jan. 19, 2004, The Institute of Electronics, Information and Communication Engineers (IEICE), pp. 25-29, vol. 103, No. 601, Tokyo, Japan (English-language abstract included, p. 1).

Rumelhart, D.E. et al., "Feature Discovery by Competitive Learning," Cognitive Science, 1985, pp. 75-112, vol. 9, No. 1, Elsevier Inc., USA.

Mongillo, G. et al., "Learning in Realistic Networks of Spiking Neurons and Spike-Driven Plastic Synapses," European Journal of Neuroscience, Jun. 2005, pp. 3143-3160, vol. 21, No. 11, Federation of European Neuroscience Societies, Berlin, Germany.

Guyonneau, R. et al., "Temporal Codes and Sparse Representations: A Key to Understanding Rapid Processing in the Visual System," Journal of Physiology—Paris, 2004, pp. 487-497, vol. 98, No. 4-6, Elsevier Ltd., USA.

Coultrip, R. et al., "A Cortical Model of Winner-Take-All Competition Via Lateral Inhibition," Neural Networks, 1992, vol. 5, No. 1, pp. 47-54, Pergamon Press PLC, USA.

Amit, D.J. et al., "Spike-Driven Synaptic Dynamics Generating Working Memory States," Neural Computation, Mar. 2003, pp. 565-596, vol. 15, No. 3, MIT Press, USA.

Baum, E.B. et al., "Internal Representations for Associative Memory," Biological Cybernetics, 1988, pp. 217-228, vol. 59, No. 4-5, Springer-Verlag, Berlin, Germany.

Lorenzo, R. et al., "A New Unsupervised Neural Network for Pattern Recognition with Spiking Neurons," Proceedings of the 2006 International Joint Conference on Neural Networks (IJCNN '06), 2006, pp. 3903-3910, IEEE, USA.

Wysoski, S.G. et al., "Fast and Adaptive Network of Spiking Neurons for Multi-View Visual Pattern Recognition," Neurocomputing, 2008, pp. 2563-2575, vol. 71, No. 13-15, Elsevier Science Publishers B.V., Amsterdam, The Netherlands.

Mitra, S. et al., "Learning to Classify Complex Patterns Using a VLSI Network of Spiking Neurons," Dissertation ETH No. 17821, 2008, pp. 1-8, MIT Press, USA.

Ritter, G.X. et al., "Lattice Associative Memories That Are Robust In The Presence Of Noise," Proceedings of SPIE—Mathematical Methods in Pattern and Image Analysis, 2005, pp. 255-260, vol. 5916, SPIE, USA.

Maass, W., "Networks of Spiking Neurons: The Third Generation of Neural Network Models," Neural Networks, 1997, pp. 1659-1671, vol. 10, No. 9, Elsevier Science Ltd., Great Britain.

Pichevar, R. et al., "The Oscillatory Dynamic Link Matcher for Spiking-Neuron-Based Pattern Recognition," Neurocomputing, 2006, pp. 1837-1849, vol. 69, No. 16-18, Elsevier B.V., USA.

Godin, C. et al., "Pattern Recognition with Spiking Neurons: Performance Enhancement Based on a Statistical Analysis," Proceedings of the 1999 International Joint Conference on Neural Networks (IJCNN '99), 1999, pp. 1876-1880, vol. 3, IEEE, USA.

Amit, D.J. et al., "Associative Memory Neural Network with Low Temporal Spiking Rates," Proceedings of the National Academy of the Sciences, Biophysics, 1989, pp. 7871-7875, vol. 86, PNAS, USA.

Saldana-Pumarica, J. et al., "CMOS Encoder for Scale-Independent Pattern Recognition," Proceedings of the 20th Annual Conference on Integrated Circuits and Systems Design (SBCCI '07), 2007, pp. 241-244, ACM, USA.

Pham, D.T. et al., "Control Chart Pattern Recognition Using Spiking Neural Networks," Proceedings of the 2nd Virtual International Conference on Intelligent Production Machines and Systems, 2006, pp. 319-325, Elsevier Ltd., USA.

Yu, B. et al., "Pulse Coupled Neural Network for Motion Detection," Proceedings of the 2003 International Joint Conference on Neural Networks, 2003, pp. 1179-1184, IEEE, USA.

Kasabov, N., "'To Spike or not to Spike': Methods, Tools and Applications of Spiking Neural Networks," Proceedings of the 2009 International Joint Conference on Neural Networks (IJCNN '09), Abstract only, Jun. 2009, 4 pp., IEEE, USA.

Kim, D.S. et al., "Self-Organizing Neural Networks for Unsupervised Pattern Recognition," Proceedings of the 10th Annual International Phoenix Conference on Computers and Communication, 1991, pp. 39-45, IEEE, USA.

Klampfl, S. et al., "Spiking Neurons Can Learn to Solve Information Bottleneck Problems and Extract Independent Components," Neural Computation, Apr. 2009, pp. 911-959, vol. 21, No. 4, MIT Press, USA.

Kiselev, M.V., "Statistical Approach to Unsupervised Recognition of Spatio-Temporal Patterns by Spiking Neurons," Proceedings of the 2003 International Joint Conference on Neural Networks, 2003, pp. 2843-2847, vol. 4, IEEE, USA.

Swartzlander, E.E. Jr., "Wafer scale integration for the implementation of artificial neural networks," Silicon Architectures for Neural Nets: Proceedings of the IFIP WG 10.5 Workshop on Silicon Architectures for Neural Nets, 1991, pp. 179-185, North-Holland, Amsterdam, The Netherlands.

Likharev, K., "Hybrid CMOS/Nanoelectronic Circuits: Opportunities and Challenges", Journal of Nanoelectronics and Optoelectronics, 2008, pp. 203-230, vol. 3, American Scientific Publishers, USA.

Song, S., et al., "Competitive Hebbian Learning through Spike-Timing-Dependent Synaptic Plasticity," Nature Neuroscience, Sep. 2000, pp. 919-926, vol. 3, No. 9, Nature America Inc., USA.

(56) References Cited

OTHER PUBLICATIONS

International Search Report and Written Opinion dated Aug. 8, 2011 for International Application No. PCT/EP2011/056701, pp. 1-14, European Patent Office, Rijswijk, The Netherlands.

Esser, S.K. et al., "Binding Sparse Spatiotemporal Patterns in Spiking Computation," Proceedings of the 2010 International Joint Conference on Neural Networks (IJCNN '10), 2010, pp. 1-9, IEEE, USA.

Yoshioka, M. et al., "Spiking-Timing-Dependent Synaptic Plasticity to Learn Spatiotemporal Patterns in Recurrent Neural Networks," Proceedings of the 17th International Conference on Artificial Neural Networks (ICANN '07), 2007, pp. 757-766, vol. 4668, Springer-Verlag, Berlin, Heidelberg, Germany.

Linares-Barranco, B. et al., "Memristance Can Explain Spike-Time-Dependent-Plasticity in Neural Synapses," Nature Precedings, 2009, pp. 1-4, Nature Publishing Group, United Kingdom.

Snider, G.S., "Spiking-Timing-Dependent Learning in Memristive Nanodevices," Proceedings of the IEEE International Symposium on Nanoscale Architectures (NANOARCH '08), 2008, pp. 85-92, IEEE, USA.

Masquelier, T. et al., "Competitive STDP-Based Spike Pattern Learning," Neural Computation, 2008, pp. 1259-1276, vol. 21, No. 5, MIT Press, USA.

Johnson, J.S. et al., "A Layered Neural Architecture for the Consolidation, Maintenance, and Updating of Representations in Visual Working Memory," Brain Research, Nov. 3, 2009, pp. 17-32, vol. 1299, Elsevier, United States.

Ermentrout, B., "Neural Networks as Spatio-Temporal Pattern Forming Systems," Reports of Progress in Physics, 1998, pp. 353-430, vol. 61, IOP Publishing Ltd., United Kingdom.

U.S. Non-Final Office Action for U.S. Appl. No. 12/828,091 mailed Aug. 30, 2012.

U.S. Advisory Action for U.S. Appl. No. 12/828,091 mailed Dec. 23, 2014.

U.S. Advisory Action for U.S. Appl. No. 12/828,091 mailed Dec. 23, 2015.

U.S. Final Office Action for U.S. Appl. No. 12/828,091 mailed Oct. 15, 2015.

U.S. Non-Final Office Action for U.S. Appl. No. 12/828,091 mailed Jun. 16, 2015.

U.S. Final Office Action for U.S. Appl. No. 12/828,091 mailed Feb. 4, 2013.

U.S. Non-Final Office Action for U.S. Appl. No. 12/828,091 mailed May 21, 2014.

U.S. Final Office Action for U.S. Appl. No. 12/828,091 mailed Oct. 10, 2014.

\* cited by examiner

CANONICAL SPIKING NEURON NETWORK FOR SPATIOTEMPORAL ASSOCIATIVE MEMORY

CROSS-REFERENCE TO RELATED APPLICATIONS

This patent application is a continuation of U.S. Non-Provisional patent application Ser. No. 12/828,091 filed Jun. 30, 2010, the disclosure of which is incorporated herein by reference.

GOVERNMENT RIGHTS

This invention was made with Government support under Agreement No. HR0011-09-C-0002 awarded by Defense Advanced Research Projects Agency (DARPA). The Government has certain rights in the invention.

BACKGROUND

The present invention relates to neural systems, and more specifically, to spatiotemporal associative memory.

Biological systems impose order on the information provided by their sensory input. This information typically comes in the form of spatiotemporal patterns comprising localized events with a distinctive spatial and temporal structure. These events occur on a wide variety of spatial and temporal scales, and yet a biological system such as the brain is still able to integrate them and extract relevant pieces of information. Such biological systems can rapidly extract signals from noisy spatiotemporal inputs.

In biological systems, the point of contact between an axon of a neuron and a dendrite on another neuron is called a synapse, and with respect to the synapse, the two neurons are respectively called pre-synaptic and post-synaptic. The essence of our individual experiences is stored in the conductance of the synapses. The synaptic conductance can change with time as a function of the relative spike times of pre-synaptic and post-synaptic neurons, as per spike-timing dependent plasticity (STDP). The STDP rule increases the conductance of a synapse if its post-synaptic neuron fires after its pre-synaptic neuron fires, and decreases the conductance of a synapse if the order of the two firings is reversed.

Neuromorphic systems, also referred to as artificial neural networks, are computational systems that permit electronic systems to essentially function in a manner analogous to that of biological brains. Neuromorphic systems create connections between processing elements that are roughly functionally equivalent to neurons of a biological brain. Neuromorphic systems may comprise various electronic circuits that are modeled on biological neurons.

BRIEF SUMMARY

Embodiments of the invention provide canonical spiking neurons for spatiotemporal associative memory. An aspect of the invention includes a method and system for spatiotemporal associative memory including a plurality of electronic neurons having a layered neural net relationship with directional synaptic connectivity. The plurality of electronic neurons are configured to detect the presence of a spatiotemporal pattern in a data stream, and extract the spatiotemporal pattern. Based on learning rules, the plurality of electronic neurons store the spatiotemporal pattern, and upon being presented with a version of the spatiotemporal pattern, retrieve the stored spatiotemporal pattern.

Another aspect of the invention includes a method for detecting the presence of a spatiotemporal pattern in a real-time data stream, extracting the spatiotemporal pattern, and based on learning rules, storing the spatiotemporal pattern in an associative memory comprising plurality of electronic neurons having a layered relationship with directional connectivity. Upon being presented with a version of the spatiotemporal pattern, the invention includes a method to retrieve the stored spatiotemporal pattern from the associative memory.

These and other features, aspects and advantages of the present invention will become understood with reference to the following description, appended claims and accompanying figures.

DETAILED DESCRIPTION

Figure 1:
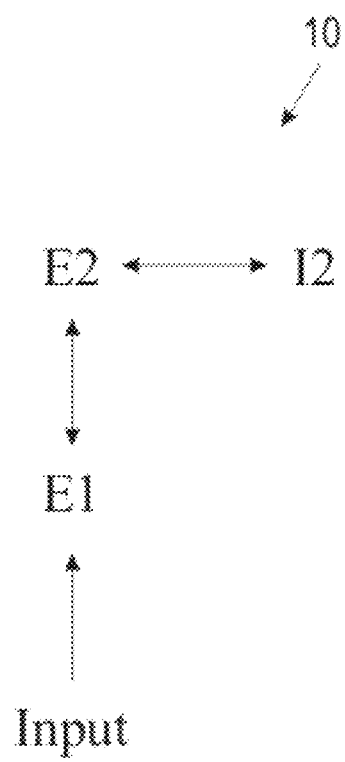
FIG. 1 shows a diagram of a system for spatiotemporal associative memory, in accordance with an embodiment of the invention.

Embodiments of the invention provide neural systems, including canonical spiking circuits for associative memory configured to store and retrieve spatiotemporal patterns.

The term "electronic neuron" as used herein represents an architecture configured to simulate a biological neuron. An electronic neuron creates connections between processing elements that are roughly functionally equivalent to neurons of a biological brain. As such, a neural system comprising electronic neurons according to embodiments of the invention may include various electronic circuits that are modeled on biological neurons. Further, a neural system comprising electronic neurons according to embodiments of the invention may include various processing elements (including computer simulations) that are modeled on biological neurons. Although certain illustrative embodiments of the invention are described hereinbelow using electronic neurons comprising electronic circuits, the present invention is not limited to electronic circuits. A neural system according to embodiments of the invention can be implemented as a neuromorphic architecture comprising analog or digital circuitry, and additionally as a computer simulation. Indeed, the embodiments of the invention can take the form of an entirely hardware embodiment, an entirely software embodiment or an embodiment containing both hardware and software elements.

An example architecture of a canonical spiking neuron system according to the invention includes neurons in layers, as well as their synaptic connections and learning rules between them. Such a system may be implemented in different ways, such as implementation through simulations on a traditional computer system or through a variety of different hardware schemes, one of which comprises synapse cross-bar array providing spike-timing dependent plasticity (described by example further below).

One embodiment of the invention comprises a spiking electronic neuron microcircuit implementing an unsupervised pattern recognition system of the associative memory type. Associative memory means a data storage device, wherein a stored memory is identified based on its informational content rather than an explicit address. Data may be retrieved from associative memory by accessing memory contents (as opposed to an explicit address) in serial or in parallel, wherein references are compared with informational content of the memory until a desirable set of one or more matches is found.

According to an embodiment of the invention, a pattern recognition system comprises an assembly of interacting spiking electronic neurons in a memory microcircuit configured to store and associatively recall spatiotemporal patterns. Learning rules provide (describe) the strengths of synaptic interconnections between the electronic neurons as a function of the patterns to be stored. For example, learning rules provide the level of conductance of synaptic interconnections between the electronic neurons as a function of the patterns to be stored.

According to an embodiment of the invention, an unsupervised pattern recognition system carries out pattern recognition tasks without any explicit external instruction mechanism. The system does not require any explicit description of the patterns. As such, the semantic content of the patterns is immaterial as long as the patterns have well defined spatiotemporal structure and statistics. Given an input data stream that contains spatiotemporal patterns, the system learns to detect the presence of the patterns, and to extract and store the patterns without requiring that any information about the patterns to be detected be provided ahead of time. The system stores the patterns in such a way that when presented with a fragmentary and/or noisy version of the stored pattern, the system is able to retrieve a proper matching pattern from memory.

In addition to the spatiotemporal patterns, the input data stream may in general contain a level of noise. The pattern recognition system carries out pattern recognition in a real-time or online fashion, and does not require separate stages for processing the incoming information. The system processes the incoming information in real-time as the data stream is fed in to the system. In an embodiment of the invention, the system architecture is modular and scalable, suitable for problems of a combinatorial nature on multiple spatial and temporal scales while using a single, streamlined architecture.

Referring now to FIG. 1, there is shown a diagram representation of the network architecture of a neural system 10, according to an embodiment of the invention. The system 10 comprises two layers E1 and E2 of excitatory spiking electronic neurons, and a layer I2 of inhibitory spiking electronic neurons. The E1 layer serves as the input layer while the E2 layer serves as the processing layer. The layer I2 implements a winner-take-all (WTA) mechanism as described further below in relation to FIG. 3.

Generally, an excitatory spiking electronic neuron makes its target neurons more likely to fire, while an inhibitory spiking electronic neuron makes its targets less likely to fire. A variety of implementations of spiking electronic neurons can be utilized. Generally, such neurons comprise a counter that increases when inputs from source excitatory neurons are received and decreases when inputs from source inhibitory neurons are received. The amount of the increase or decrease is dependent on the strength of the connection (e.g., synaptic connection modeled by a variable resistor), from a source neuron to a target neuron. If the counter reaches a certain threshold, the neuron then generates its own spike (i.e., fires) and the counter undergoes a reset to a baseline value. The term spiking electronic neuron is referred to as "electronic neuron" hereinafter.

Figure 2:
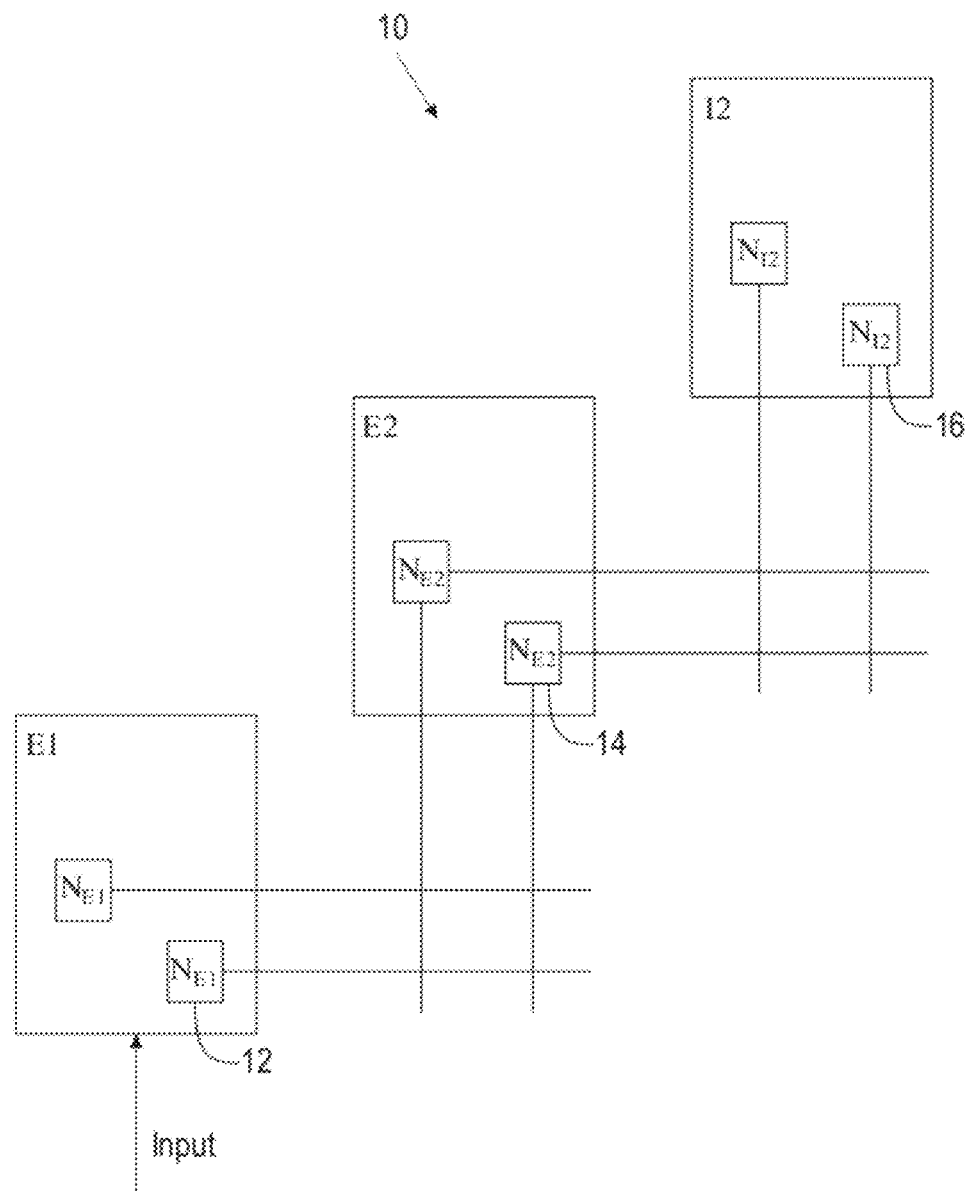
FIG. 2 shows a more detailed diagram of the system shown in FIG. 1, in accordance with an embodiment of the invention.

The electronic neurons are interconnected as follows. FIG. 2 shows a more detailed diagram of the neural system 10, illustrating populations of electronic neurons 12 (i.e., $N_{E1}$) in the layer E1 connected to electronic neurons 14 (i.e., $N_{E2}$) in the layer E2, and the electronic neurons 14 connected to the electronic neurons 12. Further, the electronic neurons 14 in the layer E2 are also connected to populations of electronic neurons 16 (i.e., $N_{I2}$) in the layer I2, and the electronic neurons 16 are connected to the electronic neurons 14. The neuron connection model is general and can be tailored according to the associative data storage/retrieval functions desired. Typically, connections are made to multiple neurons, and the E1 and E2 layers comprise multiple neurons.

The input stream comprising spatiotemporal patterns as well as noisy inputs is fed into the E1 layer where it triggers the spiking activity of the electronic neurons 12 in the E1 layer. This spiking activity propagates forward to the electronic neurons 14 of the E2 layer. As such, presence of a spatiotemporal pattern in the input data stream produces a corresponding spatiotemporal spiking image of activity in the electronic neurons 12 in the layer E1. Any electronic neurons 14 of the E2 layer within the sphere of influence of the imprinted spatiotemporal spiking image will, by virtue of connection from the E1 layer, receive a certain excitatory signal level.

Figure 3:
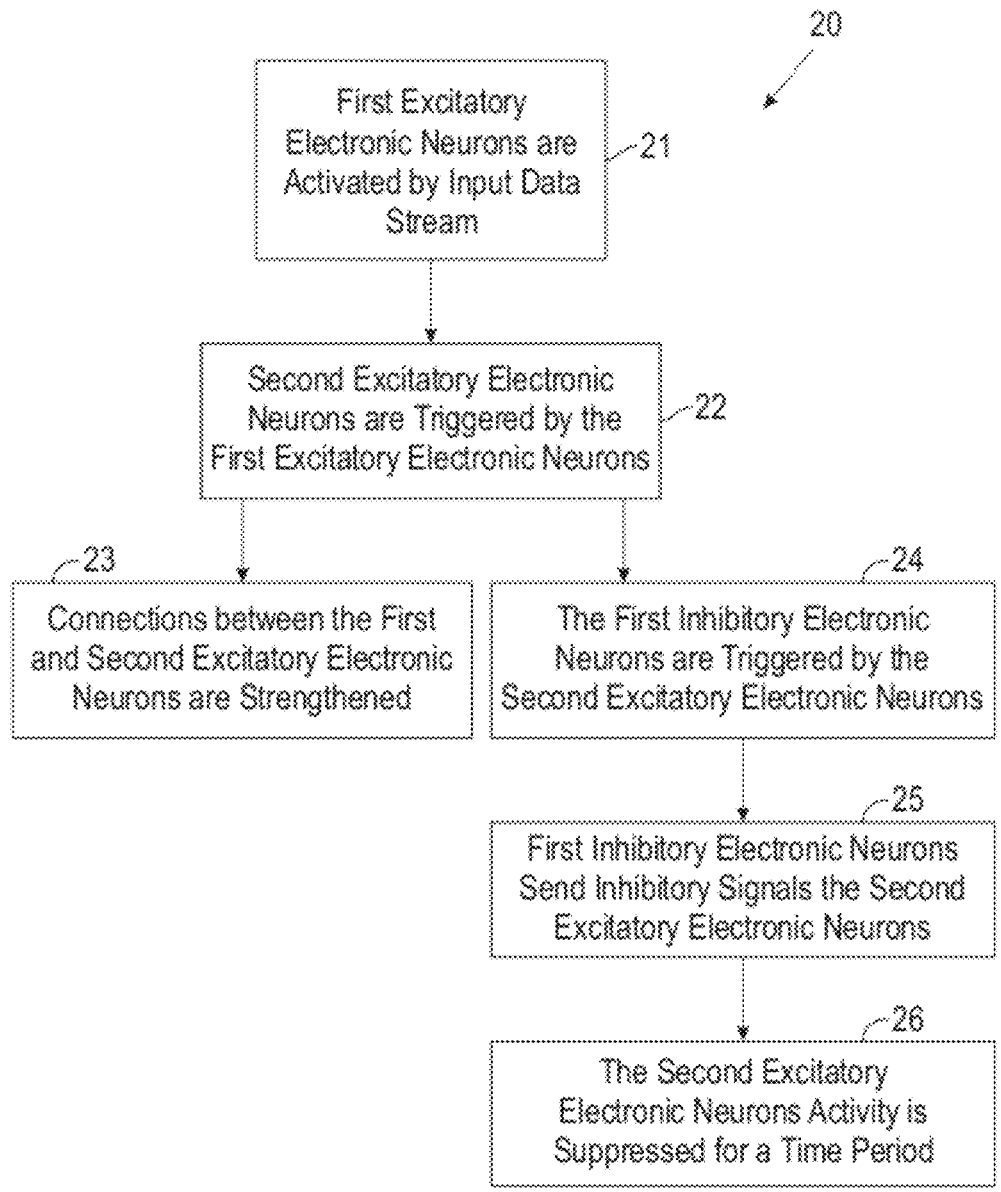
FIG. 3 shows a flowchart of the operation of a system for spatiotemporal associative memory, in accordance with an embodiment of the invention.

FIG. 3 is a flowchart showing a method 20 of the operation of the neural system 10 shown in FIGS. 1 and 2, in accordance with this embodiment of the invention. The process steps in FIG. 3 are not purely linear, but rather the E1 layer electronic neurons are constantly receiving input, and the E2 and I2 layer electronic neurons can fire at any time, depending on their input. Referring to FIG. 3, in step 21, one or more E1 layer electronic neurons 12 are activated by the input stream. In step 22, such activity can trigger an E2 layer electronic neuron 14. If neuron activity in the E2 layer follows neuron activity in the E1 layer within a short time period (e.g., about 50 ms), in step 23, the connection between such electronic neurons 12 and 14 is automatically strengthened (i.e., the conductance of a synaptic connection between the neurons 12 and 14 is increased).

Once an E2 layer electronic neuron 14 has been triggered (by one or more E1 layer electronic neurons 12), in step 24 the triggered E2 layer electronic neuron 14 triggers the activity of one or more I2 layer electronic neurons 16. In step 25, this in turn sends a strong inhibitory signal back to the E2 layer, thereby in step 26 suppressing further E2 layer activity for a brief time interval (e.g., about 10 ms).

When activity of a recently triggered E2 layer electronic neuron 14 is followed within a short time interval (e.g., about 50 ms) by the activity of an E1 layer electronic neuron 12 to which the electronic neuron 14 connects, the connection between the electronic neurons 12 and 14 is automatically weakened (i.e., the conductance of a synaptic connection between the neurons 12 and 14 is decreased).

However, if an E2 layer electronic neuron 14 fires (i.e., triggers or spikes) shortly after an E1 layer electronic neuron 12 (e.g., within about 50 ms) to which the electronic neuron 14 connects, the system 10 strengthens the connection between the electronic neurons 12 and 14.

Therefore, the connection from a given E2 layer electronic neuron 14 to a given E1 layer electronic neuron 12 is strengthened whenever it is likely that the electronic neuron 12 was involved in triggering the electronic neuron 14 in the first place. The outcome of the construction just described is that the system 10 develops a facility for enhancing associations between causal events, and suppressing acausal events.

In one embodiment of the invention, the overall stability and noise robustness of the system 10 is facilitated by implementing strength normalization. Strength normalization is accomplished by adjusting the strengths between electronic neuron connections. The system 10 is configured such that whenever the strength of a connection is increased, it is at the expense of the weakening of other connections within the system. This enables the electronic neurons to focus their influence where it is most effective, and ensures that effects due to noise become weaker in time. The normalization of connections is achieved by adjusting the strength of all excitatory synapses (connections) received by a neuron so that they remain at a constant value. Thus, if the strength of one connection to a neuron increases, the strengths of all other connections to that neuron should proportionally decrease to maintain a constant total input strength to that neuron. This is described by relation (6) described further below.

Figure 4:
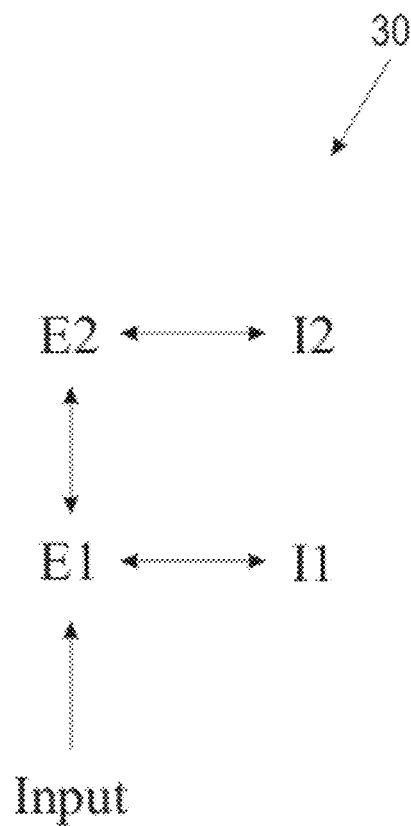
FIG. 4 shows a diagram of a neuromorphic system implementing a canonical spiking neuron method for spatiotemporal associative memory, in accordance with another embodiment of the invention.
Figure 5:
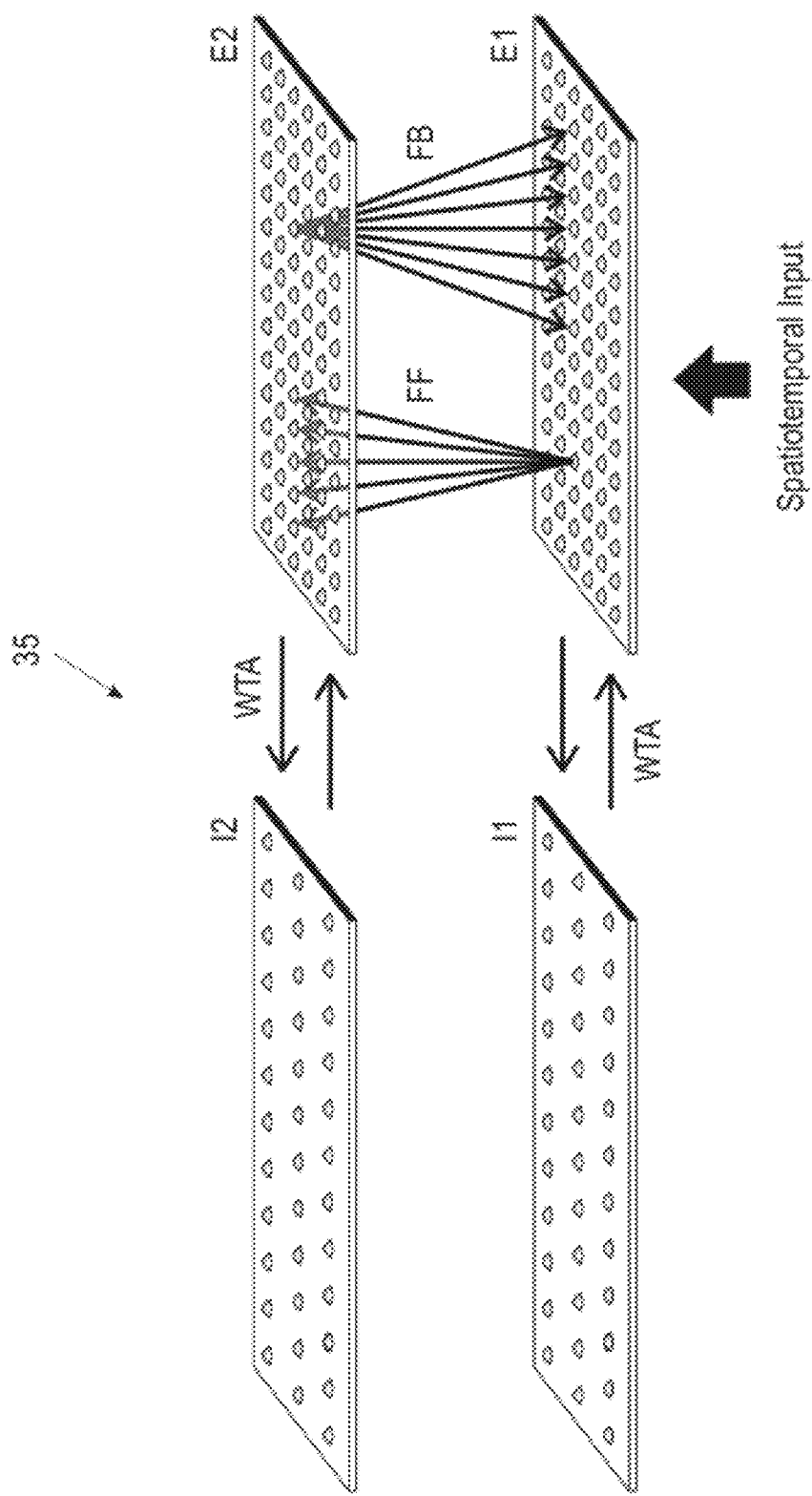
FIG. 5 shows a diagram of a layered architecture of the system shown in FIG. 4, in accordance with another embodiment of the invention.

FIG. 4 shows a diagram of a neural system 30, according to another embodiment of the invention. The system 30 comprises comprising two layers E1 and E2 of excitatory electronic neurons. The system 10 further comprises two layers I1 and I2 of inhibitory electronic neurons. Referring to FIG. 5, in one embodiment of the invention, the system 30 comprises a layered architecture 35 with directional connectivity (feedforward and feedback), implementing interplay of a winner-take-all (WTA) process via lateral inhibition and spike driven learning rules which serve to select causal associations between events.

In one example, the WTA process generally models a neural net of excitatory neurons and an inhibitory neuron. Active excitatory neurons excite the inhibitory neuron. The inhibitory neuron inhibits the excitatory neurons. Activity of the inhibitory neuron increases until most excitatory neurons are inhibited.

The architecture 35 comprises said two layers E1 and E2 of excitatory electronic neurons, said two layers I1 and I2 of inhibitory electronic neurons, providing a feed forward (FF) path with STDP and synaptic plasticity (axonal/dendritic) and a feedback path (FB) with anti-STDP and synaptic plasticity (axonal/dendritic). Specifically, the architecture 35 provides directional connectivity between the neurons (feedforward and feedback), implementing WTA via lateral inhibition and spike driven learning rules which serve to select causal associations between events. The E1 layer receives spatio-temporal inputs (e.g., images of circles or squares with temporal variations in appearance), wherein input patterns presented to the E1 layer lead to compressed representations on the E2 layer.

Partial or corrupted versions of previously encountered patterns lead to error-free retrieval of complete versions. The feedback path (FB) connections exhibit anti-STDP (i.e., aSTDP). If a corrupt or incomplete input appears at the E1 layer, the correct E2 layer neurons should fire. Based on that E2 neuron firing, the full E1 input can be reconstructed. If E1 layer neurons fire before E2 layer neurons, synapses are weakened to remove spurious activity. If E2 layer neurons fire before E1 layer neurons, synapses are strengthened for pattern completion by enhancing connections from inputs seen earlier.

A spike signal creates a voltage bias across a synaptic connection (element), resulting in a current flow into downstream neurons, such that the magnitude of the current is weighted by the conductance of the corresponding synaptic connection. In one example, a random distribution of weights is utilized, such that each E2 neuron needs input from 10% of E1 neurons, in order to spike. The feed forward (FF) connections exhibit STDP, wherein inputs leading to significant spatiotemporal correlations in E1 layer neuronal activity causes certain E2 layer neurons to fire. The I2 layer ensures that the activity in the E2 layer is limited to a very small number. If E1 layer neurons fire before E2 layer neurons, this leads to strengthening synapses to form associations. If E2 layer neurons fire before E1 layer neurons, this leads to weakening synapses to wash out noise.

Figure 6:
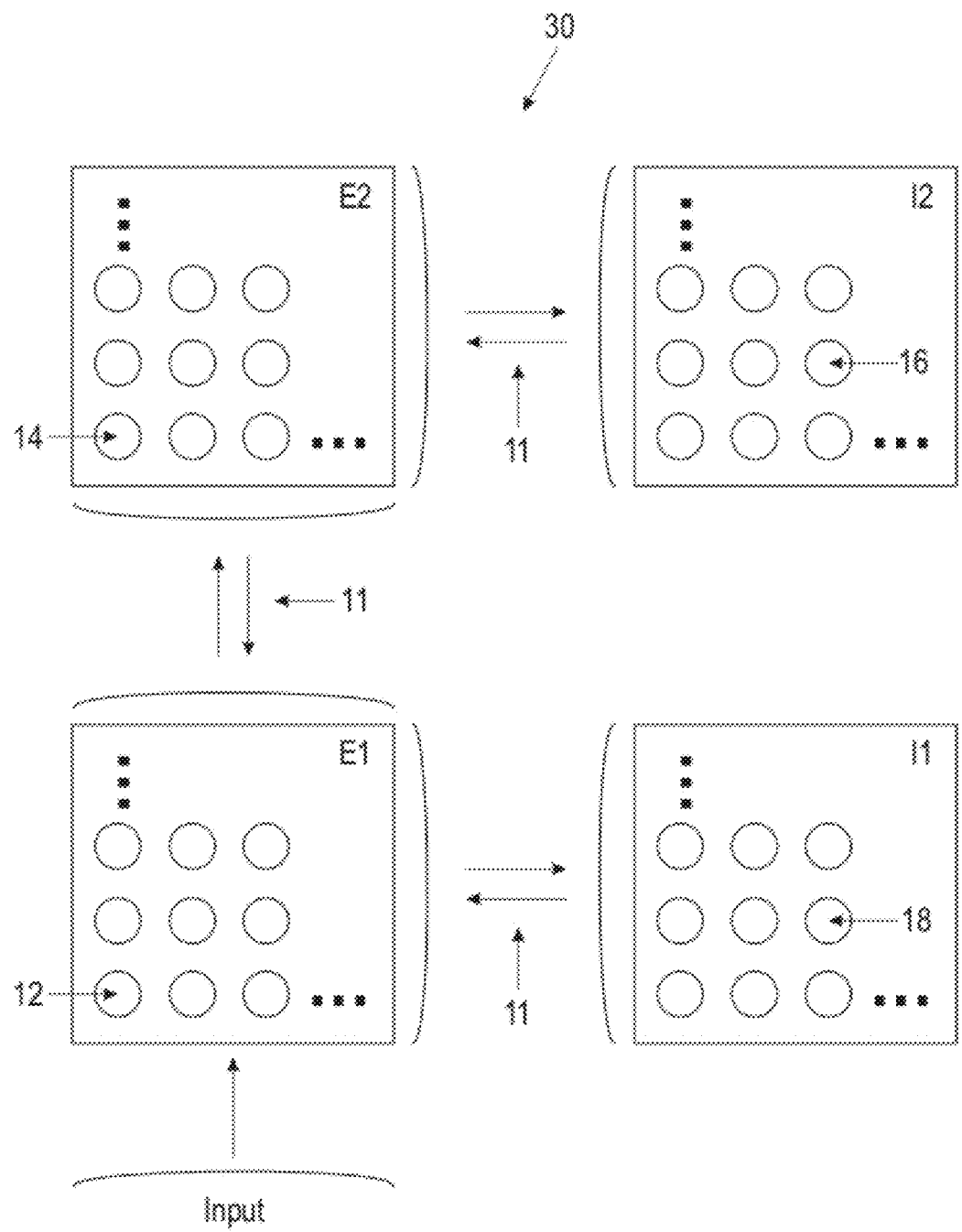
FIG. 6 shows a diagram of connections between the layers in the system shown in FIG. 5, in accordance with another embodiment of the invention.
Figure 7:
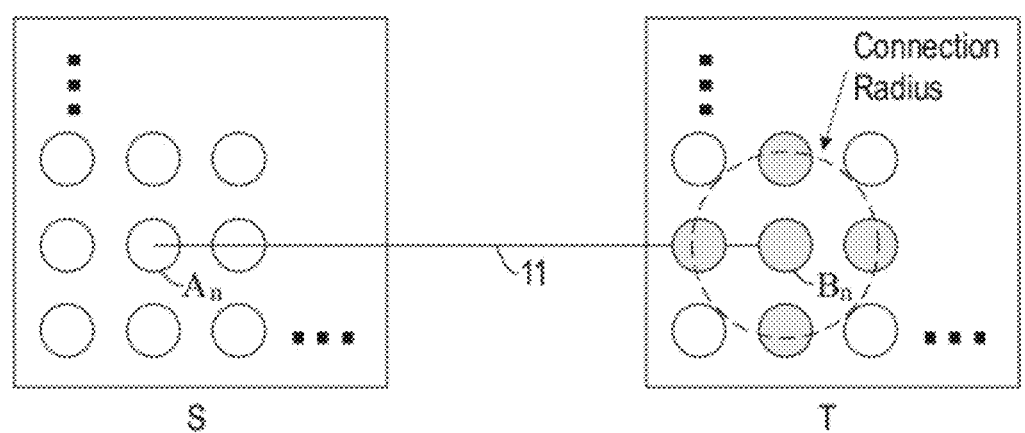
FIG. 7 shows a diagram of a connection between neurons in two layers in the system shown in FIG. 6, in accordance with another embodiment of the invention.

FIG. 6 shows a more detailed diagram of the neural system 30, illustrating that E1 and E2 layers comprise populations of excitatory electronic neurons 12 and 14 (i.e., NE1 and NE2), respectively. Further, I1 and I2 layers comprise populations (grid) of inhibitory electronic neurons 16 and 18 (i.e., NI1 and NI2), respectively. E1 layer electronic neurons serve as input neurons, while E2 electronic neurons support higher level processing. Connections 11 between neurons in different layers are as shown in more detail in FIG. 7. Connections between layers are made from each neuron ($A_n$) in a source layer S to a point, target neuron $B_n$, in the target layer T that corresponds topographically with the location of the source $A_n$ in the source layer. The source neuron $A_n$ is connected to all neurons in the target layer within a certain radius (from 0 to $\infty$) of the target neuron $B_n$.

Figure 8:
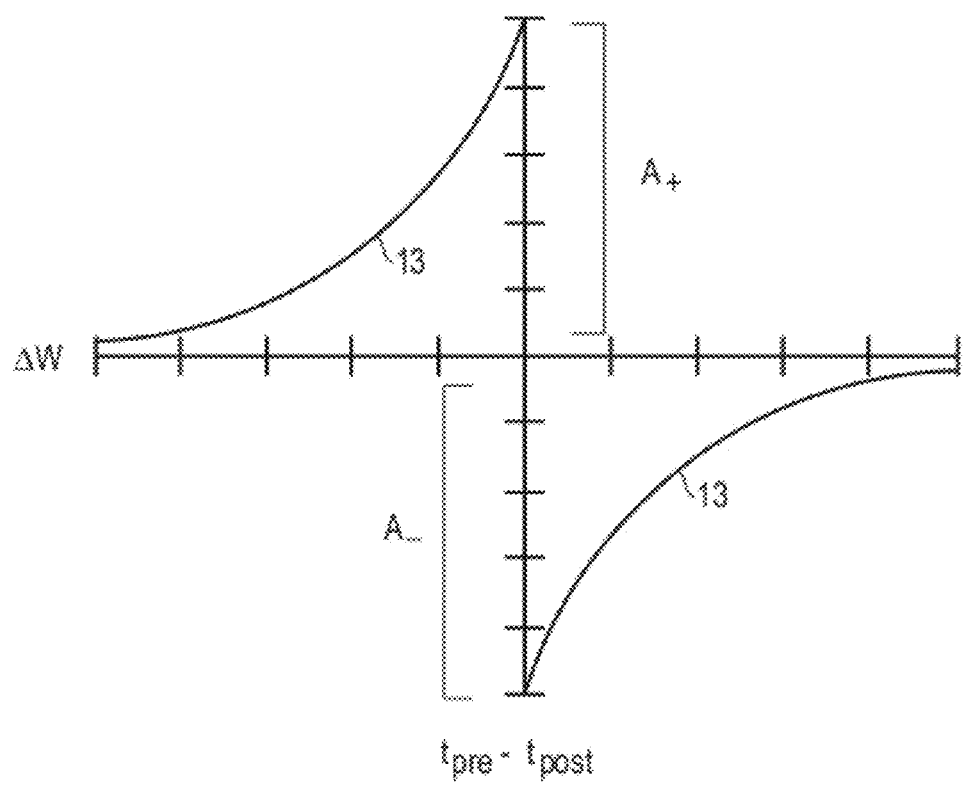
FIG. 8 shows a curve of a spike-timing dependent plasticity learning rule employed in the system shown in FIG. 6, in accordance with an embodiment of the invention.

FIG. 8 shows a spike-timing dependent plasticity learning rule employed in the system 30 (FIG. 6) as described in S. Song, K. D. Miller, and L. F. Abbott, "Competitive Hebbian learning through spike-timing-dependent synaptic plasticity," *Nature Neuroscience*, vol. 3, September 2000, pp. 919-926. The horizontal axis (x-axis) represents the time of the post-synaptic neuron spike minus the time of the pre-synaptic neuron spike. The vertical axis (y-axis) represents the change in synaptic weight, $\Delta W$, resulting from pre-post pairings with different timing. The curves 13 are derived from the equation:

$$\Delta W = A_+ e^{(t_{pre}-t_{post})/\tau_+} \text{ if } t_{pre} < t_{post}, \text{ else}$$

$$\Delta W = A_- e^{(t_{pre}-t_{post})/\tau_-}$$

where $A_+$ and $A_-$ can be positive or negative numbers and determines the size of weight change for a given timing difference, and τ is a time constant (described in more detail further below).

The electronic neurons are interconnected as follows. Each electronic neuron makes a fixed number, M, of outgoing connections with other electronic neurons. Each E1 layer electronic neuron connects to I1 layer and E2 layer electronic neurons. Each I1 layer electronic neuron connects exclusively to E1 layer electronic neurons. Similarly, each E2 layer electronic neuron connects to I2 layer and E1 layer electronic neurons. Each I2 layer electronic neuron connects exclusively to E2 layer electronic neurons. Each pathway connecting any pair of neurons is also assigned a conduction delay. The connections and the delays can be assigned either randomly (e.g., drawn from a distribution) or in a predetermined topographic fashion depending on the intended application. No population is allowed to connect back to itself.

In general, the system construction is independent of the details of the spike generating mechanism used. For completeness, a variation of the Izhikevich/Brette-Gerstner models where the dynamics of each spiking neuron is determined in terms of its depolarization variable V via equation (1) below may be used:

$$\dot{V}(t) = F(V, t) - u(t) + I(t) \qquad (1)$$
$$\dot{u}(t) = -\frac{1}{\tau_u}[u(t) - bV(t)]$$

The variable u denotes the neuron's adaptation/recovery variable, while b and $\tau_u$ are constant parameters. F is typically a convex function chosen to guarantee the existence of solutions, V (t), to equation (1) which rapidly "blow-up" when subjected to sufficiently large inputs I within a given time interval. These "explosive" events are then interpreted as spikes. Once a spike has been registered, the variable V is reset to a resting state while the adaptation variable is appropriately adjusted to account for the initiation of a recovery phase. Operationally, the spikes are captured by introducing a threshold Vthr so that a neuron is said to have fired at time t if V (t)>Vthr. Each spike is represented in terms of a binary-valued activity variable (t) via relationship (2) below:

$$\xi(t) = \begin{cases} 1 & \text{if } V(t) > V_{thr} \\ 0 & \text{otherwise} \end{cases} \qquad (2)$$

All neurons in this construction are governed by equation (1) and thus have identical behavior if subjected to identical inputs. Therefore, any variation in dynamical behavior arises only from variations in the inputs I(t). The populations E1, E2, I1 and I2 interact with each other through such input terms. For clarity of description, the populations of neurons are distinguished in terms of their inputs, and E1 and I1 neurons are labeled using indices from the sequence {j, k, ...}. The E2 and I2 neurons are labeled using indices from the sequence {α, β, ...}. Inputs to E1 neurons initiate from three sources. As discussed above, in addition to receiving external stimuli (via sensory pathways), E1 neurons also receive inputs from both I1 and E2 neurons. These sources collectively contribute to equation (1) an input term I(t) of the form in relation (3) below:

$$I_j(t) = I_j^{ext}(t) + \sum_{a \in E2} W_{ja}(t)\xi_a(t - \Delta_{ja}) - \sum_{k \in I1} W_{jk}\xi_k(t - \Delta_{jk}) \qquad (3)$$

where $I_j^{ext}$ refers to the external stimulus, Wjα and Wjk are non-negative quantities denoting the strengths of E2 ↦ E1 and I1 ↦ E1 synapses respectively, while Δjα denotes the (axonal) conduction delay between the source a and target neuron j.

Inputs to E2 neurons take the same form as relation (3) with the obvious changes in notation: substituting E2 indices for E1 indices and I1 indices for I2 indices on the right-hand side of relation (3). Since E2 neurons do not receive external stimuli, then set $I^{ext}=0$. Inputs to both I1 and I2 neurons also take the form of relation (3), except that in addition to setting $I^{ext}=0$, the inhibitory inputs are omitted since, as discussed above, I1 and I2 neurons interact only with excitatory neurons.

The strengths of E1 ↦ E2 and E2 ↦ E1 synapses are time-dependent (i.e., subject to plasticity), whereas all other synaptic weights remain fixed in time. This construction imposes two forms of plasticity mechanisms: the weights from E1 ↦ E2 evolve under conventional STDP rules, while those from E2 ↦ E1 evolve under anti-STDP. In a typical form of the rule, every registered pair of pre- and post-synaptic spike events, at $t_{pre}$ and $t_{post}$, induces a change, $\Delta W_{pre,post}$, in the strength of the synapse between the given pair of neurons (labeled here by pre and post). This change takes the form of relation (4) below:

$$\Delta W_{pre,post} = \begin{cases} A_+\exp[-(t_{post}-t_{pre})/\tau] & \text{if } t_{post} \geq t_{pre} \\ -A_-\exp[-(t_{pre}-t_{post})/\tau] & \text{if } t_{post} < t_{pre} \end{cases} \qquad (4)$$

Where $A_+$, $A_-$ and τ are positive constants. The anti-STDP rule employed in the construction according to the invention takes the form of relation (5) below:

$$\Delta W_{pre,post} = \begin{cases} -B_-\exp[-(t_{post}-t_{pre})/\tau] & \text{if } t_{post} \geq t_{pre} \\ B_+\exp[-(t_{pre}-t_{post})/\tau] & \text{if } t_{post} < t_{pre} \end{cases} \qquad (5)$$

with positive constants $B_+$, $B_-$ and τ.

The competitive aspect of the dynamics is implemented utilizing a "normalized" version of the weights. Let t+ denote the time immediately following any elementary update time t in the course of a simulation. Constrain the weights associated with any given neuron, say α, by:

$$\frac{W_{\alpha j}(t_+)}{\sum_k W_{\alpha k}(0)} \equiv \frac{W_{\alpha j}(t)}{\sum_k W_{\alpha k}(t)} \qquad (6)$$

guaranteeing that $\Sigma_k W_{\alpha k}(t_+)$ remains constant for all t and α. This constraint is supplemented by a hard-and-fast rule which, by fiat, ensures that $0 \leq W_{\alpha j} \leq W_{max}$, for all indices α, j, and a pre-determined constant $W_{max}$. The competitive dynamics is further facilitated by introducing a process for contrast enhancement in the inputs, which involves replacing $I_j(t)$ in relation (3) with relation (7) below:

$$I_j(t_+) \equiv I_j(t) - \frac{1}{N_{E1}}\sum_{k \in E1} I_k(t) \text{ for all } j \in E1 \qquad (7)$$

Similar expressions for inputs to E2, I1 and I2 are obtained by an appropriate commutation of indices.

A protocol for the presentation of inputs is outlined below. This protocol involves arbitrarily partitioning the input electronic neuron array, E1, into p clusters (indexed by μ= 1, ..., p) with each cluster containing approximately the same number of input neurons. In this example, the presentation of a particular input pattern manifests itself as a flurry of activity over a fixed time interval, confined mainly to a particular cluster. The confinement need not be strict, and partial overlaps are allowed, as well as sporadic events anywhere on the neuron array. This allows association of specific "temporal input patterns" with specific input clusters.

In one example scenario below, patterns are presented to E1, one at a time, over intervals of length T, and each presentation is followed by a silent period of length $T_s$. Taking $\Delta t$ as the elementary unit of time, let T, $T_s \gg \Delta t$, set $T_+ = T + T_s$, and let $T_{train} \gg T$, $T_s$ be the duration of a "training" phase. A protocol for the presentation of inputs (stimulus) is as follows in Table 1:

TABLE 1

1. Set $\lambda = 1$, $\mu = 1$, $t_1^{(1)} = 0$.
2. While $t_\lambda^{(\mu)} + T_t \geq T_{train}$
   - Fix a time interval $[t_\lambda^{(\mu)}, t_\lambda^{(\mu)} + T) \cup [t_\lambda^{(\mu)} + T, t_\lambda^{(\mu)} + T_+)$ along with the cluster E1μ.
   - At each step t,
     if $t \in [t_\lambda^{(\mu)}, t_\lambda^{(\mu)} + T)$, select a random neuron $j \in$ E1μ and inject that neuron with a superthreshold input $I_å$ guaranteeing that the neuron fires.
   - else if $t \in [t_\lambda^{(\mu)} + T, t_\lambda^{(\mu)} + T_+)$ enter the silent phase.
3. At the end of the silent phase,
   - if $\mu < p$, set $t_\lambda^{(\mu+1)} = t_\lambda^{(\mu)} + T_+$, advance $\mu \leftarrow \mu + 1$, and proceed to step 2.
   - else if $\mu = p$, set $t_{\lambda+1}^{(1)} = t_\lambda^{(p)} + T_+$, advance $\lambda \leftarrow \lambda + 1$, reset $\mu \leftarrow 1$, and proceed to step 2.

Table 2 below illustrates an online implementation of the input presentation protocol above, wherein the routine Choose (n,E1μ) returns a list of n E1 neurons to be triggered.

TABLE 2

Subroutine stimulusProtocol
  parameters p, T, $T_+$, $T_{train}$, a partition E1 = $\cup_{\mu=1}^p$ E1μ.
  inputs t.
  $\tau = t \bmod pT_+$
  if $\tau \bmod T_+ \geq T$ (i.e., in silent phase), set $\vec{I}^{ext}(t) = \vec{0}$.
  else
  $$\mu = 1 + \frac{\tau - (\tau \bmod T_+)}{T_+}$$
  $$I_j^{ext}(t) = \begin{cases} I_å & \text{if } j \in \text{Choose}(n, E1\mu) \\ 0 & \text{otherwise} \end{cases}.$$

Variations of the stimulus (input) protocol at different levels of complexity are possible, without affecting the outcome according to embodiments of the invention. Example variations include introducing levels of noise in the stimulus (inputs), as well as allowing for overlapping patterns, e.g., the activity of E1μ may partially coincide with that of E1υ for $\mu \neq \upsilon$.

In accordance with the input/stimulus presentation protocol outlined above, during the training phase, the pattern E1μ is presented to the neural system (network) for the nth time in the time interval:

$$\tau(n,\mu) = [(np+\mu-1)T_+, (np+\mu)T_+) \quad (8)$$

A particular subset of E1 units in the pattern μ for activation at each time step $t \in \tau(n, \mu)$ is selected, wherein selectE1(t) denotes such a subset, and firedE1(t) denotes the set of E1 neurons observed to have fired at time t, selectE1(t)=Ø is adopted for all t<0. Now define E1'(n, μ; t) firedE1(t)\ selectE1(t−Δt) and $$E1'(n, \mu) := \bigcup_{t \in \tau(n,\mu)} E1'(n, \mu; t)$$

Thus, E1'(n,μ) comprises the set of E1 neurons which can only have fired via recurrent (feedback) activity. As such, for each n and μ, relation (9) provides the measures:

$$R(n, \mu) \equiv \frac{\|E1\mu \cap E1'(n, \mu)\|}{\|E1\mu\|}, \quad (9)$$

$$P(n, \mu) \equiv \frac{\|E1\mu \cap E1'(n, \mu)\|}{\|E1'(n, \mu)\|},$$

wherein $\|S\|$ denotes the cardinality of a set S, and $0 \leq R(n, \mu)$, $P(n, \mu) \leq 1$, such that since E1'(n, μ) is the reciprocated image of input (feedforward) activity registered in E1, then R(n, μ) measures the amount of "reciprocal image agrees with the actual input," i.e., R(n, μ) is large for a high level of agreement between the reciprocated image and actual input, and low otherwise. R(n, μ) is thus a measure of "recall", such that upon being presented with a version of the spatiotemporal pattern, the system retrieves the stored spatiotemporal pattern. Similarly, P(n, μ) measures the "precision" with which associations between actual and induced activities are made.

Averaged versions of said measure are:

$$R(\mu) \equiv \frac{1}{N} \sum_{n=1}^N R(n, \mu), \quad R \equiv \frac{1}{p} \sum_{\mu=1}^p R(\mu)$$

$$P(\mu) \equiv \frac{1}{N} \sum_{n=1}^N P(n, \mu), \quad P \equiv \frac{1}{p} \sum_{\mu=1}^p P(\mu)$$

$$\hat{P}(\mu) \equiv \frac{1}{N} \sum_{n=1}^N \hat{P}(n, \mu), \quad \hat{P} \equiv \frac{1}{p} \sum_{\mu=1}^p \hat{P}(\mu)$$

Table 3 illustrates an example simulation according to the invention, wherein the notation $\vec{q}$ denotes objects with the structure $\vec{q} := (q_{E1}, q_{E2}, q_{I1}, q_{I2})$, where the indices E1, E2, I1, and I2 serve as multi-indices labeling quantities in populations E1, E2, I1, and I2. Further, $M_{E1,E2}$ refers to a matrix M with row indices in E1 and column indices in E2. Given any two matrices M and Δ, the operator * is defined by setting $$(M\vec{a} \vec{q}(t-\Delta))m \equiv \Sigma_n M_{mn} q_n(t - \Delta_{mn})$$

wherein an elementary time step scaled to in appropriate units is utilized, such that:

TABLE 3

I. Set-up static parameters: network connectivity matrix c, conduction delay matrix $\Delta, \Delta_{max} := \max(\Delta)$, static weights $W_{E1,I1}, W_{I1,E1}, W_{E2,I2}, W_{I2,E2}$
II. Initialize dynamic variables $\vec{V}$, $\vec{u}$, and $W^+ := (W_{E1,E2}, W_{E2,E1})$.
Initialize dynamic variables: $\vec{\xi}(-\Delta_{max}) =: \vec{\xi}(-\Delta_{max} + 1) = ... = \vec{\xi}(0) = \vec{0}$.
III. For $0 \leq t < T_{stop}$,
$\vec{I}^{ext}(t) = $ stimulusProtocol(t), $\quad \vec{I}^{syn}(t) = W(t) å \vec{\xi}(t - \Delta)$,
$\vec{I}_{constrast}(t) = \vec{I}^{ext}(t) + \vec{I}^{syn}(t) - \langle \vec{I}^{ext}(t) + \vec{I}^{syn}(t) \rangle_{population\ avg.}$
$(\vec{V}(t+1), \vec{u}(t+1), \vec{\xi}(t+1)) = $ updateState$(\vec{V}(t), \vec{u}(t),$
$\vec{I}_{contrast}(t))$
$W^+(t+1) = $ updateWeights$(t, W^+(t), \{\vec{\xi}(s) | s \in [t - \Delta_{max}, t]\})$
Subroutine stimulusProtocol
  returns $\vec{I}^{ext}(t)$ (i.e., Table 2).
Subroutine updateState
  Parameters $b, \tau_u, V_{reset}, V_{thr}, ...$
  inputs $\vec{V}(t), u(\vec{t}), \vec{I}_{contrast}(t)$ via equation (1).
  returns $\vec{V}(t+1), \vec{u}(t+1), \vec{\xi}(t+1)$ via equation (1).
Subroutine updateWeights
  Parameters $A_+, A_-, B_+, B_-, \tau, \Delta_{max}$
  Inputs $t, W_{E1,E2}(t), W_{E2,E1}(t), \{\vec{\xi}(S)\}_{s=t-\Delta_{max}}^t$ TABLE 3-continued Update $W_{E1,E2}$ and $W_{E2,E1}$ via STDP and anti-STDP respectively using activity histories (i.e., equations (4) and (5)).
Enforce $0 \leq W_{E1,E2}, W_{E2,E1} \leq W_{max}$. Normalize the result using relation (6).
returns $W_{E1,E2}(t + 1), W_{E2,E1}(t + 1)$ In one embodiment of the invention, the temporal span of the input pattern, though random and variable, falls within given lower and upper bounds, such as between about 10 ms and about 100 ms. Noise, however, is assumed to be continuously present in the input pattern. The patterns occur repeatedly over reasonably long time intervals. In one example, a spatial scale determines whether a particular series of spatiotemporal events constitute a pattern.

A neural method and system according to an embodiment of the invention implements features of cortical networks, including spiking neurons, spike-time driven learning rules and recurrent connections between neurons. The system requires only a single spike per neuron to perform input pattern identification and subsequent pattern recall, following an unsupervised training session. The system may serve as an intermediate processing stage of a larger system, wherein a functionally significant amount of processing can occur under time constraints similar to those suggested by neurobiological experiments.

According to an embodiment of the invention, the neural system implements an architecture configured to accommodate spiking neurons with competitive dynamics and unsupervised learning. The neural system implements transient neuron assemblies with activity that extinguishes as soon as a successful retrieval has been carried out and once the pattern is deactivated. Such transient assemblies allow for an efficient rapid successive activation and retrieval of memories. The neural system comprises a dedicated neural circuit for pattern completion with the ability to pinpoint events that require attention and subsequent analysis. The neural system is readily amenable to incorporation into a modular framework, with each module having the basic two-layer electronic neuron implementation disclosed herein.

As an example, a modular framework construction comprises stacking the basic two-layer modules in a hierarchical fashion, with each level in the hierarchy representing features at varying degrees of abstraction. Additional neuron layers (e.g., E2a, E2b, etc.) may be added to the basic two-layer system, with each neuron layer responding, in parallel, to different pattern features in the same input stream. This can be achieved by using different receptive field profiles for each neuron layer sheet. Alternatively, the system may comprise multiple E1 layers with distinct input streams all feeding into a single E2 layer. The system can consolidate previously-learned patterns into complex composites by taking various permutations and combinations of these alternatives.

The embodiments of the invention can take the form of an entirely hardware embodiment, an entirely software embodiment or an embodiment containing both hardware and software elements. An example architecture of a canonical spiking neuron system according to the invention as described above includes neurons in layers E1, E2, I1 and I2 as well as their connections and learning rules between them. Such a system may be implemented in different ways, such as implementation through simulations on a traditional computer system or through a variety of different hardware schemes, one of which comprises an ultra-dense synapse cross-bar array providing spike-timing dependent plasticity.

Figure 9:
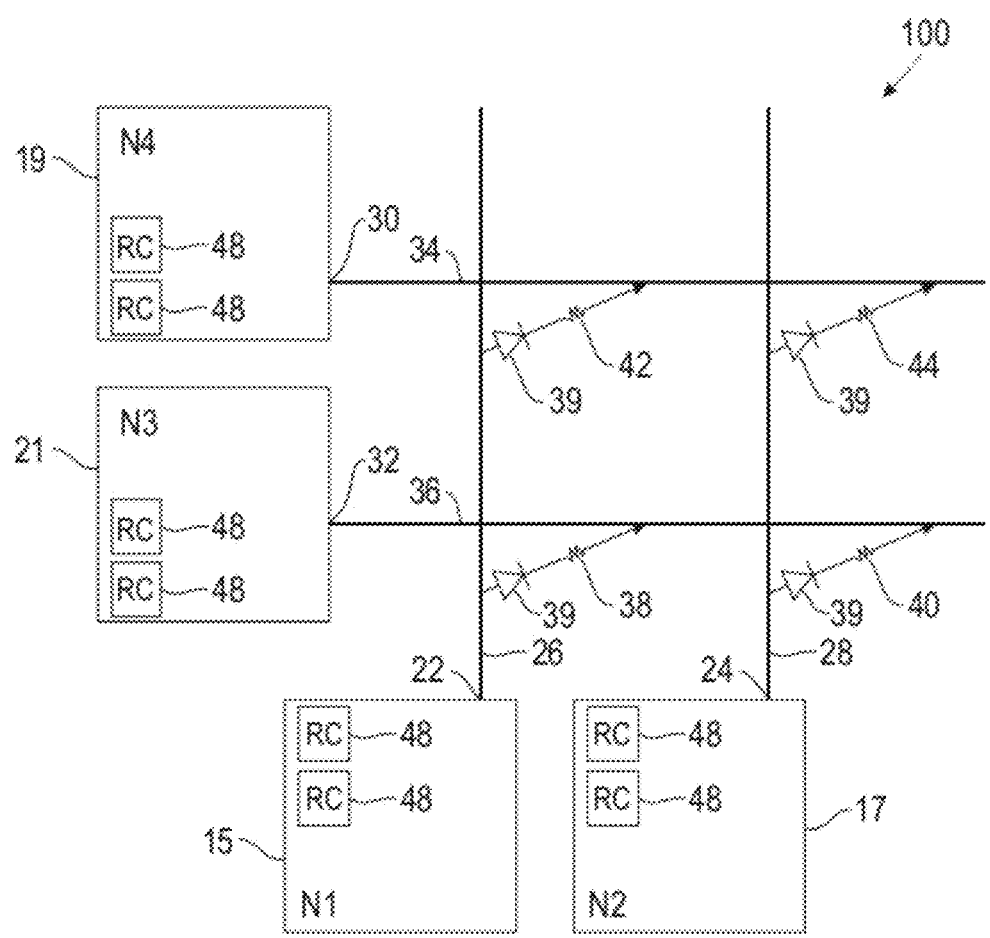
FIG. 9 shows an example of an ultra-dense synapse cross-bar array providing spike-timing dependent plasticity, useful for implementing one embodiment of the present invention.

The term "ultra-dense cross-bar array" as used herein refers to cross-bar arrays that may have a pitch in the range of about 0.1 nm to 10 μm. FIG. 9 shows an example neural system including a cross-bar array 100 having a plurality of neurons 15, 17, 19 and 21. These neurons are also referred to herein as "electronic neurons." Neurons 15 and 17 are axonal neurons and neurons 19 and 21 are dendritic neurons. Axonal neurons 15 and 17 are shown with outputs 22 and 24 connected to axons 26 and 28, respectively. Dendritic neurons 19 and 21 are shown with inputs 30 and 32 connected to dendrites 34 and 36, respectively. Axonal neurons 15 and 17 also contain inputs and receive signals along dendrites, however, these inputs and dendrites are not shown for simplicity of illustration. Thus, the axonal neurons 15 and 17 will function as dendritic neurons when receiving inputs along dendritic connections. Likewise, the dendritic neurons 19 and 21 will function as axonal neurons when sending signals out along their axonal connections. When any of the neurons 15, 17, 19 and 21 fire, they will send a pulse out to their axonal and to their dendritic connections.

Each connection between axons 26, 28 and dendrites 34, 36 are made through a variable state resistor 38, 40, 42 and 44. The junctions where the variable state resistors are located may be referred to herein as "cross-point junctions." The term "variable state resistor" refers to a class of devices in which the application of an electrical pulse (either a voltage or a current) will change the electrical conductance characteristics of the device. For a general discussion of cross-bar array neural systems, as well as to variable state resistors as used in such cross-bar arrays, reference is made to K. Likharev, "Hybrid CMOS/Nanoelectronic Circuits: Opportunities and Challenges", J. Nanoelectronics and Optoelectronics, 2008, Vol. 3, p. 203-230, 2008, which is hereby incorporated by reference. In one embodiment of the invention, the variable state resistor may comprise a phase change memory (PCM). Besides PCM devices, other variable state resistor devices that may be used in embodiments of the invention include devices made using metal oxides, sulphides, silicon oxide and amorphous silicon, magnetic tunnel junctions, floating gate FET transistors, and organic thin film layer devices, as described in more detail in the above-referenced article by K. Likharev. The variable state resistor may also be constructed using a static random access memory device. Also attached to the variable state resistors is an access device 39, which may comprise a PN diode, an FET wired as a diode, or some other element with a nonlinear voltage-current response.

Neurons 15, 17, 19 and 21 each include a pair of RC circuits 48. In general, in accordance with an embodiment of the invention, axonal neurons 15 and 17 will "fire" (transmit a pulse) when the inputs they receive from dendritic input connections (not shown) exceed a threshold. When axonal neurons 15 and 17 fire they maintain an A-STDP variable that decays with a relatively long, predetermined, time constant determined by the values of the resistor and capacitor in one of its RC circuits 48. For example, in one embodiment, this time constant may be 50 ms. The A-STDP variable may be sampled by determining the voltage across the capacitor using a current mirror, or equivalent circuit. This variable is used to achieve axonal STDP, by encoding the time since the last firing of the associated neuron. Axonal STDP is used to control "potentiation", which in this context is defined as increasing synaptic conductance.

When dendritic neurons 19, 21 fire they maintain a D-STDP variable that decays with a relatively long, predetermined, time constant based on the values of the resistor and capacitor in one of its RC circuits 48. For example, in one embodiment, this time constant may be 50 ms. In other embodiments this variable may decay as a function of time. For example the variable may decay according to linear, polynomial, or quadratic functions. In another embodiment of the invention, the variable may increase instead of decreasing over time. In any event, this variable may be used to achieve dendritic STDP, by encoding the time since the last firing of the associated neuron. Dendritic STDP is used to control "depression," which in this context is defined as decreasing synaptic conductance.

Embodiments of the invention can take the form of a computer simulation or program product accessible from a computer-usable or computer-readable medium providing program code for use by or in connection with a computer, processing device, or any instruction execution system. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 10:
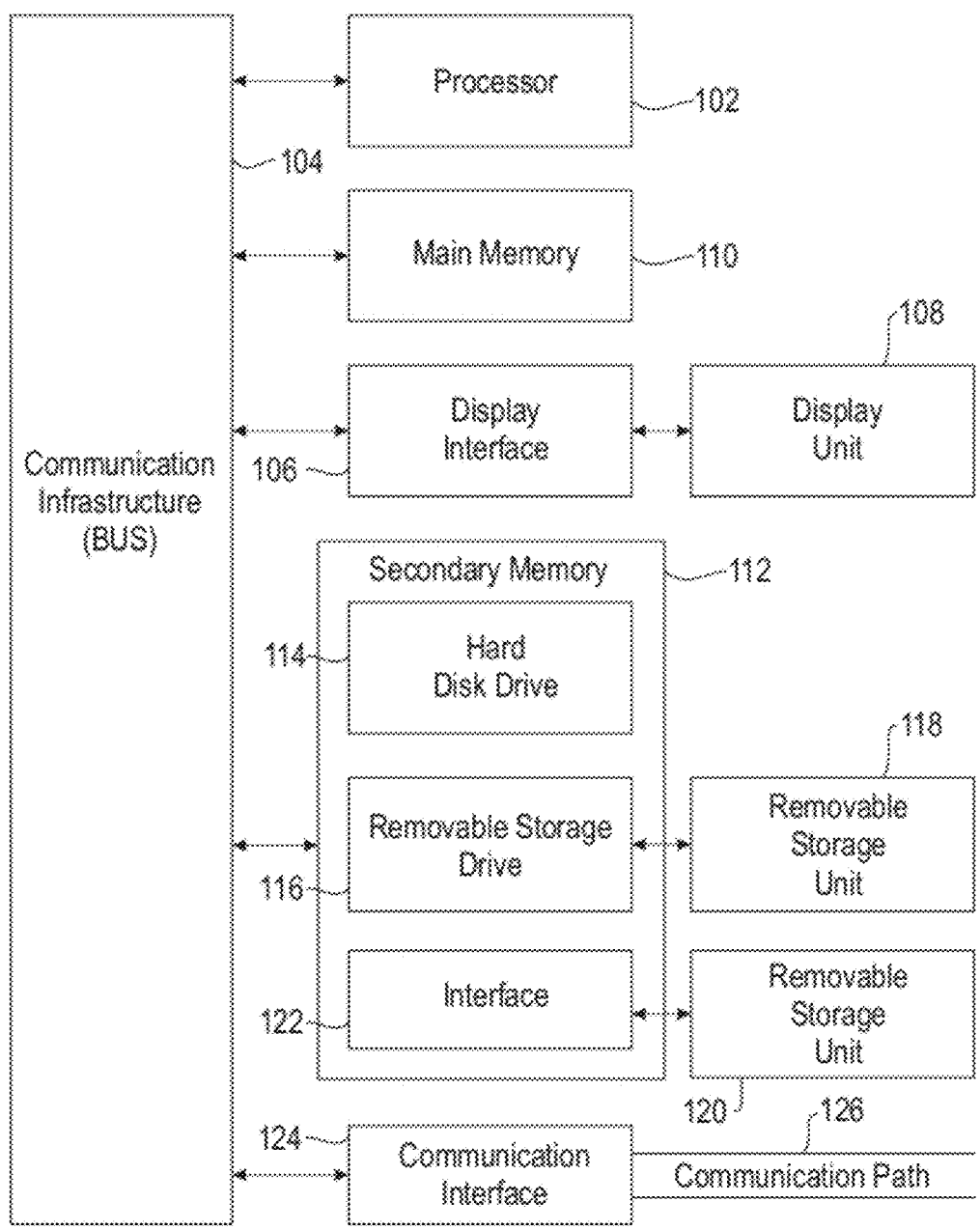
FIG. 10 shows a high level block diagram of an information processing system useful for implementing one embodiment of the present invention.

FIG. 10 is a high level block diagram showing an information processing system useful for implementing one embodiment of the present invention. The computer system includes one or more processors, such as a processor 102. The processor 102 is connected to a communication infrastructure 104 (e.g., a communications bus, cross-over bar, or network).

The computer system can include a display interface 106 that forwards graphics, text, and other data from the communication infrastructure 104 (or from a frame buffer not shown) for display on a display unit 108. The computer system also includes a main memory 110, preferably random access memory (RAM), and may also include a secondary memory 112. The secondary memory 112 may include, for example, a hard disk drive 114 and/or a removable storage drive 116, representing, for example, a floppy disk drive, a magnetic tape drive, or an optical disk drive. The removable storage drive 116 reads from and/or writes to a removable storage unit 118 in a manner well known to those having ordinary skill in the art. Removable storage unit 118 represents, for example, a floppy disk, a compact disc, a magnetic tape, or an optical disk, etc., which is read by and written to by removable storage drive 116. As will be appreciated, the removable storage unit 118 includes a computer readable medium having stored therein computer software and/or data.

In alternative embodiments, the secondary memory 112 may include other similar means for allowing computer programs or other instructions to be loaded into the computer system. Such means may include, for example, a removable storage unit 120 and an interface 122. Examples of such means may include a program package and package interface (such as that found in video game devices), a removable memory chip (such as an EPROM, or PROM) and associated socket, and other removable storage units 120 and interfaces 122 which allow software and data to be transferred from the removable storage unit 120 to the computer system.

The computer system may also include a communications interface 124. Communications interface 124 allows software and data to be transferred between the computer system and external devices. Examples of communications interface 124 may include a modem, a network interface (such as an Ethernet card), a communications port, or a PCMCIA slot and card, etc. Software and data transferred via communications interface 124 are in the form of signals which may be, for example, electronic, electromagnetic, optical, or other signals capable of being received by communications interface 124. These signals are provided to communications interface 124 via a communications path (i.e., channel) 126. This communications path 126 carries signals and may be implemented using wire or cable, fiber optics, a phone line, a cellular phone link, an radio frequency (RF) link, and/or other communication channels.

In this document, the terms "computer program medium," "computer usable medium," and "computer readable medium" are used to generally refer to media such as main memory 110 and secondary memory 112, removable storage drive 116, and a hard disk installed in hard disk drive 114.

Computer programs (also called computer control logic) are stored in main memory 110 and/or secondary memory 112. Computer programs may also be received via a communication interface 124. Such computer programs, when run, enable the computer system to perform the features of the present invention as discussed herein. In particular, the computer programs, when run, enable the processor 102 to perform the features of the computer system. Accordingly, such computer programs represent controllers of the computer system. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method, comprising:
   in a training phase:
      partitioning a plurality of electronic neurons into multiple clusters, each cluster comprising approximately the same number of neurons; and
      associating one or more spatiotemporal patterns with one or more clusters of the multiple clusters by:
         presenting the one or more spatiotemporal patterns to the one or more clusters, wherein the one or more spatiotemporal patterns are presented one at a time over fixed time intervals of a first pre-determined length, each presentation of a spatiotemporal pattern followed by a silent period of a second pre-determined length, and each presentation of a spatiotemporal pattern confined primarily to one cluster of the multiple clusters; and
         based on one or more learning rules, storing the one or more spatiotemporal patterns in the plurality of electronic neurons, wherein the one or more learning rules provide a level of conductance of synaptic interconnections between the plurality of electronic neurons as a function of the one or more spatiotemporal patterns; and
   upon being presented with a spatiotemporal pattern of the one or more spatiotemporal patterns stored, retrieving the spatiotemporal pattern from the plurality of electronic neurons;
   wherein pattern recognition data indicative of the spatiotemporal pattern retrieved is provided as output for display on a device; and
   wherein the plurality of electronic neurons comprise multiple layers of electronic neurons including a first layer and a second layer, wherein a first neuron in the first layer is connected to a second neuron in the second layer that corresponds topographically with a location of the first neuron in the first layer, and wherein the first neuron in the first layer is further connected to one or more other neurons in the second layer within a pre-determined radius of the second neuron in the second layer.

2. The method of claim 1, wherein:
   the plurality of electronic neurons have a layered relationship with directional synaptic connectivity;
   the multiple layers of electronic neurons comprise:
      a first excitatory spiking electronic neuron layer comprising one or more excitatory spiking electronic neurons;
      a second excitatory spiking electronic neuron layer comprising one or more excitatory spiking electronic neurons; and
      a first inhibitory spiking electronic neuron layer comprising one or more inhibitory spiking electronic neurons; and
   a source excitatory spiking electronic neuron in the first excitatory spiking electronic neuron layer is connected to a target excitatory spiking electronic neuron in the second excitatory spiking electronic neuron layer that corresponds topographically with a location of the source excitatory spiking electronic neuron in the first excitatory spiking electronic neuron layer, and the source excitatory spiking electronic neuron in the first excitatory spiking electronic neuron layer is further connected to one or more other excitatory spiking electronic neurons in the second excitatory spiking electronic neuron layer within a pre-determined radius of the target excitatory spiking electronic neuron in the second excitatory spiking electronic neuron layer;

a source excitatory spiking electronic neuron in the second excitatory spiking electronic neuron layer is connected to a target excitatory spiking electronic neuron in the first excitatory spiking electronic neuron layer and to an inhibitory spiking electronic neuron in the first inhibitory spiking electronic neuron layer, and the source excitatory spiking electronic neuron in the second excitatory spiking electronic neuron layer is further connected to one or more other excitatory spiking electronic neurons in the first excitatory spiking electronic neuron layer within a pre-determined radius of the target excitatory spiking electronic neuron in the first excitatory spiking electronic neuron layer; and each inhibitory spiking electronic neuron in the first inhibitory spiking electronic neuron layer is connected to an excitatory spiking electronic neuron in the second excitatory spiking electronic neuron layer.

3. The method of claim 2, further comprising:

receiving an input data stream including the one or more spatiotemporal patterns at the first excitatory spiking electronic neuron layer; and processing the input data stream via the first and second excitatory spiking electronic neuron layers and the first inhibitory spiking electronic neuron layer, in combination.

4. The method of claim 3, further comprising:

excitatory spiking electronic neurons in the second excitatory spiking electronic neuron layer and inhibitory spiking electronic neurons in the first inhibitory spiking electronic neuron layer performing a winner-take-all process based on lateral inhibition and the one or more learning rules for detecting causal associations between events to retrieve the spatiotemporal pattern from the plurality of electronic neurons.

5. The method of claim 4, further comprising:

based on the one or more learning rules, upon an excitatory spiking electronic neuron in the first excitatory spiking electronic neuron layer activation by the input data stream, triggering a connected excitatory spiking electronic neuron in the second excitatory spiking electronic neuron layer, and strengthening a level of conductance of a synaptic interconnection between the excitatory spiking electronic neuron in first second excitatory spiking electronic neuron layer and the connected excitatory spiking electronic neuron in the second excitatory spiking electronic neuron layer.

6. The method of claim 5, further comprising:

based on the one or more learning rules, upon an excitatory spiking electronic neuron in the second excitatory spiking electronic neuron layer being triggered by one or more excitatory spiking electronic neurons in the first excitatory spiking electronic neuron layer, triggering a connected inhibitory spiking electronic neuron in the first inhibitory spiking electronic neuron layer, causing a strong inhibitory signal back to the excitatory spiking electronic neuron in the second excitatory spiking electronic neuron layer, and suppressing further activity by the excitatory spiking electronic neuron in the second excitatory spiking electronic neuron layer for a time interval.

7. The method of claim 6, further comprising:

based on the one or more learning rules, upon activity of a recently triggered excitatory spiking electronic neuron in the second excitatory spiking electronic neuron layer being followed by the activity of a connected excitatory spiking electronic neuron in the first excitatory spiking electronic neuron layer, weakening a level of conductance of a synaptic interconnection between the excitatory spiking electronic neuron in the second excitatory spiking electronic neuron layer and the connected excitatory spiking electronic neuron in the first excitatory spiking electronic neuron layer.

8. The method of claim 5, further comprising:

based on the one or more learning rules, upon an excitatory spiking electronic neuron in the second excitatory spiking electronic neuron layer firing a brief interval after a connected excitatory spiking electronic neuron in the first excitatory spiking electronic neuron layer, strengthening a level of conductance of a synaptic interconnection between the excitatory spiking electronic neuron in the second excitatory spiking electronic neuron layer and the connected excitatory spiking electronic neuron in the first excitatory spiking electronic neuron layer.

9. A system comprising a computer processor, a computer-readable hardware storage device, and program code embodied with the computer-readable hardware storage device for execution by the computer processor to implement a method comprising:

in a training phase:
    partitioning a plurality of electronic neurons into multiple clusters, each cluster comprising approximately the same number of neurons; and
    associating one or more spatiotemporal patterns with one or more clusters of the multiple clusters by:
        presenting the one or more spatiotemporal patterns to the one or more clusters, wherein the one or more spatiotemporal patterns are presented one at a time over fixed time intervals of a first pre-determined length, each presentation of a spatiotemporal pattern followed by a silent period of a second pre-determined length, and each presentation of a spatiotemporal pattern confined primarily to one cluster of the multiple clusters; and
        based on one or more learning rules, storing the one or more spatiotemporal patterns in the plurality of electronic neurons, wherein the one or more learning rules provide a level of conductance of synaptic interconnections between the plurality of electronic neurons as a function of the one or more spatiotemporal patterns; and upon being presented with a spatiotemporal pattern of the one or more spatiotemporal patterns stored, retrieving the spatiotemporal pattern from the plurality of electronic neurons;

wherein pattern recognition data indicative of the spatiotemporal pattern retrieved is provided as output for display on a device; and wherein the plurality of electronic neurons comprise multiple layers of electronic neurons including a first layer and a second layer, wherein a first neuron in the first layer is connected to a second neuron in the second layer that corresponds topographically with a location of the first neuron in the first layer, and wherein the first neuron in the first layer is further connected to one or more other neurons in the second layer within a pre-determined radius of the second neuron in the second layer.

10. The system of claim 9, wherein:
the plurality of electronic neurons have a layered relationship with directional synaptic connectivity;
the multiple layers of electronic neurons comprise:
- a first excitatory spiking electronic neuron layer comprising one or more excitatory spiking electronic neurons;
- a second excitatory spiking electronic neuron layer comprising one or more excitatory spiking electronic neurons; and
- a first inhibitory spiking electronic neuron layer comprising one or more inhibitory spiking electronic neurons; and a source excitatory spiking electronic neuron in the first excitatory spiking electronic neuron layer is connected to a target excitatory spiking electronic neuron in the second excitatory spiking electronic neuron layer that corresponds topographically with a location of the source excitatory spiking electronic neuron in the first excitatory spiking electronic neuron layer, and the source excitatory spiking electronic neuron in the first excitatory spiking electronic neuron layer is further connected to one or more other excitatory spiking electronic neurons in the second excitatory spiking electronic neuron layer within a pre-determined radius of the target excitatory spiking electronic neuron in the second excitatory spiking electronic neuron layer;

a source excitatory spiking electronic neuron in the second excitatory spiking electronic neuron layer is connected to a target excitatory spiking electronic neuron in the first excitatory spiking electronic neuron layer and to an inhibitory spiking electronic neuron in the first inhibitory spiking electronic neuron layer, and the source excitatory spiking electronic neuron in the second excitatory spiking electronic neuron layer is further connected to one or more other excitatory spiking electronic neurons in the first excitatory spiking electronic neuron layer within a pre-determined radius of the target excitatory spiking electronic neuron in the first excitatory spiking electronic neuron layer; and each inhibitory spiking electronic neuron in the first inhibitory spiking electronic neuron layer is connected to an excitatory spiking electronic neuron in the second excitatory spiking electronic neuron layer.

11. The system of claim 10, the method further comprising:
receiving an input data stream including the one or more spatiotemporal patterns at the first excitatory spiking electronic neuron layer; and
processing the input data stream via the first and second excitatory spiking electronic neuron layers and the first inhibitory spiking electronic neuron layer, in combination.

12. The system of claim 11, the method further comprising:
excitatory spiking electronic neurons in the second excitatory spiking electronic neuron layer and inhibitory spiking electronic neurons in the first inhibitory spiking electronic neuron layer performing a winner-take-all process based on lateral inhibition and the one or more learning rules for detecting causal associations between events to retrieve the spatiotemporal pattern from the plurality of electronic neurons.

13. The system of claim 12, the method further comprising:
based on the one or more learning rules, upon an excitatory spiking electronic neuron in the first excitatory spiking electronic neuron layer activation by the input data stream, triggering a connected excitatory spiking electronic neuron in the second excitatory spiking electronic neuron layer, and strengthening a level of conductance of a synaptic interconnection between the excitatory spiking electronic neuron in first second excitatory spiking electronic neuron layer and the connected excitatory spiking electronic neuron in the second excitatory spiking electronic neuron layer.

14. The system of claim 13, the method further comprising:
based on the one or more learning rules, upon an excitatory spiking electronic neuron in the second excitatory spiking electronic neuron layer being triggered by one or more excitatory spiking electronic neurons in the first excitatory spiking electronic neuron layer, triggering a connected inhibitory spiking electronic neuron in the first inhibitory spiking electronic neuron layer, causing a strong inhibitory signal back to the excitatory spiking electronic neuron in the second excitatory spiking electronic neuron layer, and suppressing further activity by the excitatory spiking electronic neuron in the second excitatory spiking electronic neuron layer for a time interval.

15. The system of claim 14, the method further comprising:
based on the one or more learning rules, upon activity of a recently triggered excitatory spiking electronic neuron in the second excitatory spiking electronic neuron layer being followed by the activity of a connected excitatory spiking electronic neuron in the first excitatory spiking electronic neuron layer, weakening a level of conductance of a synaptic interconnection between the excitatory spiking electronic neuron in the second excitatory spiking electronic neuron layer and the connected excitatory spiking electronic neuron in the first excitatory spiking electronic neuron layer.

16. The system of claim 15, the method further comprising:
based on the one or more learning rules, upon an excitatory spiking electronic neuron in the second excitatory spiking electronic neuron layer firing a brief interval after a connected excitatory spiking electronic neuron in the first excitatory spiking electronic neuron layer, strengthening a level of conductance of a synaptic interconnection between the excitatory spiking electronic neuron in the second excitatory spiking electronic neuron layer and the connected excitatory spiking electronic neuron in the first excitatory spiking electronic neuron layer.

17. A computer program product comprising a computer readable hardware storage device having program code embodied therewith, the program code being executable by a computer to implement a method comprising:
in a training phase:
partitioning a plurality of electronic neurons into multiple clusters, each cluster comprising approximately the same number of neurons; and
associating one or more spatiotemporal patterns with one or more clusters of the multiple clusters by:
presenting the one or more spatiotemporal patterns to the one or more clusters, wherein the one or more spatiotemporal patterns are presented one at a time over fixed time intervals of a first pre-determined length, each presentation of a spatiotemporal pattern followed by a silent period of a second pre-determined length, and each presentation of a spatiotemporal pattern confined primarily to one cluster of the multiple clusters; and based on one or more learning rules, storing the one or more spatiotemporal patterns in the plurality of electronic neurons, wherein the one or more learning rules provide a level of conductance of synaptic interconnections between the plurality of electronic neurons as a function of the one or more spatiotemporal patterns; and upon being presented with a spatiotemporal pattern of the one or more spatiotemporal patterns stored, retrieving the spatiotemporal pattern from the plurality of electronic neurons;

wherein pattern recognition data indicative of the spatiotemporal pattern retrieved is provided as output for display on a device; and wherein the plurality of electronic neurons comprise multiple layers of electronic neurons including a first layer and a second layer, wherein a first neuron in the first layer is connected to a second neuron in the second layer that corresponds topographically with a location of the first neuron in the first layer, and wherein the first neuron in the first layer is further connected to one or more other neurons in the second layer within a pre-determined radius of the second neuron in the second layer.

18. The computer program product of claim 17, wherein:

the plurality of electronic neurons have a layered relationship with directional synaptic connectivity;

the multiple layers of electronic neurons comprise:

a first excitatory spiking electronic neuron layer comprising one or more excitatory spiking electronic neurons;

a second excitatory spiking electronic neuron layer comprising one or more excitatory spiking electronic neurons; and a first inhibitory spiking electronic neuron layer comprising one or more inhibitory spiking electronic neurons; and a source excitatory spiking electronic neuron in the first excitatory spiking electronic neuron layer is connected to a target excitatory spiking electronic neuron in the second excitatory spiking electronic neuron layer that corresponds topographically with a location of the source excitatory spiking electronic neuron in the first excitatory spiking electronic neuron layer, and the source excitatory spiking electronic neuron in the first excitatory spiking electronic neuron layer is further connected to one or more other excitatory spiking electronic neurons in the second excitatory spiking electronic neuron layer within a pre-determined radius of the target excitatory spiking electronic neuron in the second excitatory spiking electronic neuron layer;

a source excitatory spiking electronic neuron in the second excitatory spiking electronic neuron layer is connected to a target excitatory spiking electronic neuron in the first excitatory spiking electronic neuron layer and to an inhibitory spiking electronic neuron in the first inhibitory spiking electronic neuron layer, and the source excitatory spiking electronic neuron in the second excitatory spiking electronic neuron layer is further connected to one or more other excitatory spiking electronic neurons in the first excitatory spiking electronic neuron layer within a pre-determined radius of the target excitatory spiking electronic neuron in the first excitatory spiking electronic neuron layer; and each inhibitory spiking electronic neuron in the first inhibitory spiking electronic neuron layer is connected to an excitatory spiking electronic neuron in the second excitatory spiking electronic neuron layer.

19. The computer program product of claim 18, the method further comprising:

receiving an input data stream including the one or more spatiotemporal patterns at the first excitatory spiking electronic neuron layer; and processing the input data stream via the first and second excitatory spiking electronic neuron layers and the first inhibitory spiking electronic neuron layer, in combination.

20. The computer program product of claim 19, the method further comprising:

excitatory spiking electronic neurons in the second excitatory spiking electronic neuron layer and inhibitory spiking electronic neurons in the first inhibitory spiking electronic neuron layer performing a winner-take-all process based on lateral inhibition and the one or more learning rules for detecting causal associations between events to retrieve the spatiotemporal pattern from the plurality of electronic neurons.

\* \* \* \* \*